(12) United States Patent  
Saxler et al.

(10) Patent No.: US 7,238,082 B2  
(45) Date of Patent: Jul. 3, 2007

(54) WORKPIECE HEADSTOCK

(75) Inventors: Wilfrid Saxler, Brühl (DE); Stefan Rothenaicher, Erkheim (DE); Viktor Kopp, Erftstadt (DE)

(73) Assignee: Alfred H. Schutte GmbH & Co. KG, Cologne (DE)

( * ) Notice: Subject to any disclaimer, the term of this patent is extended or adjusted under 35 U.S.C. 154(b) by 0 days.

(21) Appl. No.: 11/353,393

(22) Filed: Feb. 14, 2006

(65) Prior Publication Data

US 2006/0194513 A1 Aug. 31, 2006

(30) Foreign Application Priority Data

Feb. 15, 2005 (DE) ...................... 10 2005 007 038

(51) Int. Cl.  
*B24B 49/00* (2006.01)
(52) U.S. Cl. .................... 451/5; 451/8; 451/9; 451/365
(58) Field of Classification Search .................... 451/5, 451/8, 9, 10, 11, 365  
See application file for complete search history.

(56) References Cited

U.S. PATENT DOCUMENTS

| | | | |
|---|---|---|---|
| 3,769,756 A * | 11/1973 | Kipple et al. | 451/135 |
| 5,174,179 A | 12/1992 | Hiestand | |
| 5,616,070 A * | 4/1997 | Rice et al. | 451/62 |
| 5,971,682 A | 10/1999 | Vig | |
| 6,470,776 B1 | 10/2002 | Boland et al. | |
| 6,865,787 B2 * | 3/2005 | Shingai et al. | 29/28 |

FOREIGN PATENT DOCUMENTS

DE 3929010 A1 4/1990

(Continued)

*Primary Examiner*—Eileen P. Morgan  
(74) *Attorney, Agent, or Firm*—Fay Sharpe LLP

(57) ABSTRACT

Workpiece headstock for a machine tool, especially for a grinding machine,
- with a spindle (6);
- with a clamping device (7), which is connected to the spindle (6) and which is used to clamp a workpiece (8) to be machined; and
- with a spindle drive (9),
- where, a loosenable alignment interface (14) is provided between two sections of the spindle (6), between the spindle (6) and the clamping device (7), or between two sections of the clamping device (7);
- where, after the alignment interface (14) has been loosened and while the workpiece headstock (1) otherwise remains stationary, the clamping device (7) and thus the workpiece (8) clamped in it can be aligned in a plane perpendicular to the spindle axis (15), as a result of which any existing offset between the workpiece axis (17) and the spindle axis (15)—i.e., the eccentricity of the clamped workpiece (8)—can be eliminated;
- where an adjusting device (18) is provided for the alignment of the clamping device (7),
- the adjusting device (18) is designed as a unit separate from the clamping device (7) and from the spindle (6) and has an actuating drive (19); in that
- the clamping device (7) can be aligned by the motor of the actuating drive (19); in that
- a sensor arrangement (20) is provided, from the measurement values of which the eccentricity of the clamped workpiece (8) can be determined; in that
- an alignment control unit (21) is provided, which is connected on one side to the actuating drive (19) and on the other side to the sensor arrangement (20) in a manner suitable for the purpose of control technology; and in that
- to align the clamping device (7), the alignment control unit (21) operates the actuating drive (19) as a function of the measurement values provided by the sensor arrangement (20) and thus cooperates with the actuating drive (19) and the sensor arrangement (20) to form a closed-loop control circuit.

19 Claims, 4 Drawing Sheets

FOREIGN PATENT DOCUMENTS

| | | |
|---|---|---|
| DE | 89 15 435 U1 | 7/1990 |
| EP | 0314333 | * 10/1988 |
| WO | WO 2004/007128 A1 | 1/2004 |
| WO | WO 2004/043646 A1 | 5/2004 |

* cited by examiner

WORKPIECE HEADSTOCK

This application claims priority to Foreign Patent Application DE 10 2005 007 038.8 Filed on Feb. 15, 2005.

The present invention pertains to a workpiece headstock and, more particularly, to a workpiece headstock that can be used with for a grinding machine.

The term "workpiece headstock" is to be understood comprehensively here. It is applicable to all types of machine tools with rotating tools work pieces such as cylindrical grinding machines and lathes. The term "spindle" pertains basically in the following to the workpiece spindle of the workpiece headstock.

BACKGROUND OF INVENTION

The truth of running of the clamped workpiece is especially important with respect to the machining accuracy which the machine tool in question can achieve. Factors which can cause an undesirable decrease in the truth of running include, first, the presence of an angle between the workpiece axis and the spindle axis and, second, the presence of an offset between the workpiece axis and the spindle axis. This offset is also referred to as the "eccentricity" of the clamped workpiece. The present description pertains exclusively to the eccentricity of the clamped workpiece.

The known workpiece headstock (WO 2004/007128 A1), from which the present invention proceeds, is equipped with a spindle and a clamping device, which is connected to the spindle and which is designed as a spring collet chuck. The spring collet chuck is connected to the spindle by way of a flange joint with straining screws. So that any eccentricity of the workpiece which may be present can be corrected during the alignment procedure, adjusting screws are provided circumferentially around the spring collet chuck, each of which bears radially against the spindle. To align the chuck, the straining screws of the flange joint are slightly loosened, so that, by appropriate actuation of the adjusting screws, the spring chuck can be adjusted radially with respect to the spindle. The flange joint therefore represents simultaneously an alignment interface, which makes it possible to align the clamping device. In addition, a comparable arrangement is provided between the two sections of the spring collet chuck. This arrangement is used to make any precision adjustments which may be needed to correct for the possible eccentricity of the workpiece to be clamped subsequently in the chuck.

The disadvantage of the known workpiece headstock is that the work of aligning the clamping device to eliminate the eccentricity of the clamped workpiece takes a great deal of time and requires a great deal of skill on the part of the operator. The alignments achieved with this type of adjusting device based on radial adjusting screws, furthermore, are not reproducible.

Another disadvantage of the known workpiece headstock is that the adjusting device is integrated into the clamping device. This makes it more difficult to manufacture the clamping device and also leads to design limitations in the realization of the adjusting device because of the limited space available. Insofar as the workpiece headstock is designed to accommodate several different clamping devices, each replaceable clamping device must be equipped with its own appropriate adjusting device. In addition, imbalances which can unfavorably affect the machining of the workpiece are almost always associated with this type of adjusting device.

A similar concept for aligning the clamping device for a tool is described in EP 0 882 535 A1. Here two sections of the clamping device are again connected to each other by way of a flange joint with straining screws. The clamping device is aligned to eliminate the eccentricity of the tool by slightly loosening the straining screws and by placing a special adjusting tool on the clamping device. By means of the adjusting tool, the two sections of the clamping device can be shifted toward each other in the radial direction with respect to the axis of the spindle. As in the above-described workpiece headstock, the success of the alignment procedure depends to a great extent on the skill of the operator.

It is also known that the eccentricity of a workpiece on a lathe can be adjusted effectively so that workpieces which include eccentric sections can be machined. The eccentricity of the workpiece can be adjusted here by rotating the two sections of the clamping device, which are connected by an alignment interface, with respect to each other around the spindle axis. This is done by using the spindle drive to turn the spindle, which thus turns one of the two sections of the clamping device. Simultaneously, a stationary mandrel holds the other section of the clamping device so that it cannot turn. The arrangement is set up so that the clamping device is loosened first, and then the alignment interface is loosened, so that the two sections of the clamping device can be rotated with respect to each other. The mandrel also has the function of ensuring that enough retaining force is being exerted on the workpiece and for this purpose exerts an axial force on the clamping device during the adjustment of the eccentricity.

The disadvantage of the workpiece headstock just described is again the fact that the adjusting device for aligning the clamping device is integrated into the clamping device. In addition, the truth of running which can be achieved with this adjusting device is limited.

Another known workpiece headstock of a machine tool (DE 89 15 435 U1) is equipped with a clamping device with a workpiece holder, which can be shifted freely in a direction perpendicular to the spindle axis. To guide the workpiece, two axially aligned steadies are arranged in front of the workpiece holder. The disadvantage here is that a comparatively large amount of effort is required to manufacture the clamping device. An additional support device is also required to prevent the workpiece holder from dropping under its own weight when the workpiece is being changed.

A fundamentally similar concept can be found in EP 1 419 852 A1, which describes a workpiece headstock with hydrostatic spindle bearings. The forward spindle bearing facing the clamping device is adjusted in such a way that it has a larger amount of radial bearing play than the rear spindle bearing. Here, too, the workpiece is guided by a steady, which is installed in front of the workpiece holder.

Finally, it should also be pointed out that any eccentricity of the clamped workpiece which may be present can also be corrected by automatic control means (DE 198 82 642 T1). Especially when workpieces of small dimensions are being machined, however, this variant imposes severe requirements on the drive engineering of the machine tool.

STATEMENT OF INVENTION

The invention is based on the problem of improving the design of the known workpiece headstock in such a way that the clamping device can be aligned with both high precision and with high reproducibility at the same time and also so that the headstock can be manufactured at low cost.

More particularly, workpiece headstock for a machine tool, especially for a grinding machine with a spindle, a clamping device which is connected to the spindle and which is used to clamp a workpiece to be machined. The headstock having a spindle drive where, a loosenable alignment interface is provided between two sections of the spindle, between the spindle and the clamping device, or between two sections of the clamping device. Such that after the alignment interface has been loosened and while the workpiece headstock otherwise remains stationary, the clamping device and thus the workpiece clamped in it can be aligned in a plane perpendicular to the spindle axis. As a result of which any existing offset between the workpiece axis and the spindle axis, i.e., the eccentricity of the clamped workpiece, can be eliminated. An adjusting device is also provided for the alignment of the clamping device. The adjusting device of the headstock being designed as a unit separate from the clamping device and from the spindle and having an actuating drive in that the clamping device can be aligned by the motor of the actuating drive and a sensor arrangement is provided, from the measurement values of which the eccentricity of the clamped workpiece can be determined and an alignment control unit is provided, which is connected on one side to the actuating drive and on the other side to the sensor arrangement in a manner suitable for the purpose of control technology, and in that to align the clamping device, the alignment control unit operates the actuating drive as a function of the measurement values provided by the sensor arrangement and thus cooperates with the actuating drive and the sensor arrangement to form a closed-loop control circuit.

The first essential point is that the adjusting device is equipped with an actuating drive, so that the power required to align the clamping device is provided by the motor of the actuating drive. A sensor arrangement can also be provided, so that the eccentricity of the clamped workpiece can be determined on the basis of the measurements produced by the sensors. Finally, the alignment control unit can be connected to the actuating drive and to the sensor arrangement and forms together with these components a closed-loop control circuit.

The closed-loop circuit mentioned above forms the basis of a system by which the clamping device can be aligned automatically. As a result, a precise and reproducible alignment is always possible without dependence on the skill of an operator.

With respect to design, the proposed solution is especially advantageous in the sense that the adjusting device is designed separately from the clamping device, so that there are few if any design limitations on the realization of the adjusting device, especially on the realization of the actuating drive of the adjusting device.

An even higher degree of automation can provided by if the alignment control unit uses the sensor arrangement to determine the eccentricity of the clamped workpiece first, before the alignment procedure, and then positions the workpiece by means of the spindle drive in such a way that, in the ideal case, the motorized alignment is reduced to a single automatically controlled actuating movement of the actuating drive in its working direction.

According to another aspect of the present invention, the eccentricity of the workpiece can be determined easily by measuring the extension of the clamped workpiece in the radial direction relative to the spindle axis at different spindle measurement positions and thus workpiece positions, while the sensor arrangement and measuring device are being held stationary. When the workpiece has a continuous cylindrical outside surface, the spindle measurement positions can be selected almost at random. As a result, the eccentricity can be determined with minimal effort.

Determining the eccentricity is more difficult in the case of workpieces such as drill bits, milling cutters, etc., which need to be reground and which do no have a continuously cylindrical outside surface. The measurements required to determine the eccentricity in these cases must be performed at very specific points on the workpiece, preferably on the minor cutting edges of a drill bit and preferably on the teeth, especially on the associated cutting edge, of a milling cutter.

According to another aspect of the present invention, the sensor arrangement can be used first to determine the position of, for example, the minor cutting edges of a clamped drill bit or of the teeth of a clamped milling cutter, so that the measurements required for determining the eccentricity can be conducted at the points which are optimal for each specific case.

According to a further aspect of the present invention, the alignment control unit can be provided with a database of geometric data for the clamped workpiece in question. The position of the previously described special measurement points can thus be easily determined.

According to yet another aspect of the present invention, the alignment control unit can utilize a sensor arrangement to measure the eccentricity at a minimum of two different axial positions. Further, the headstock can be configured such that the flow of forces which develops during the alignment procedure pass only via the alignment interface and the actuating drive, not via the spindle bearings, etc.

Depending the desired degree of automation, it is possible for the alignment interface to be loosened manually before the automatic alignment procedure. In one embodiment, the alignment interface can be loosened and tightened by the motor of an interface drive, which means that the entire alignment procedure can be carried out automatically.

BRIEF DESCRIPTION OF DRAWINGS

The foregoing, and more will, in part, be obvious and, in part, be pointed out more fully hereinafter, in conjunction with a written description of preferred embodiments of the present invention illustrated in the accompanying drawings in which.

DESCRIPTION OF PREFERRED EMBODIMENTS

Figure 1:
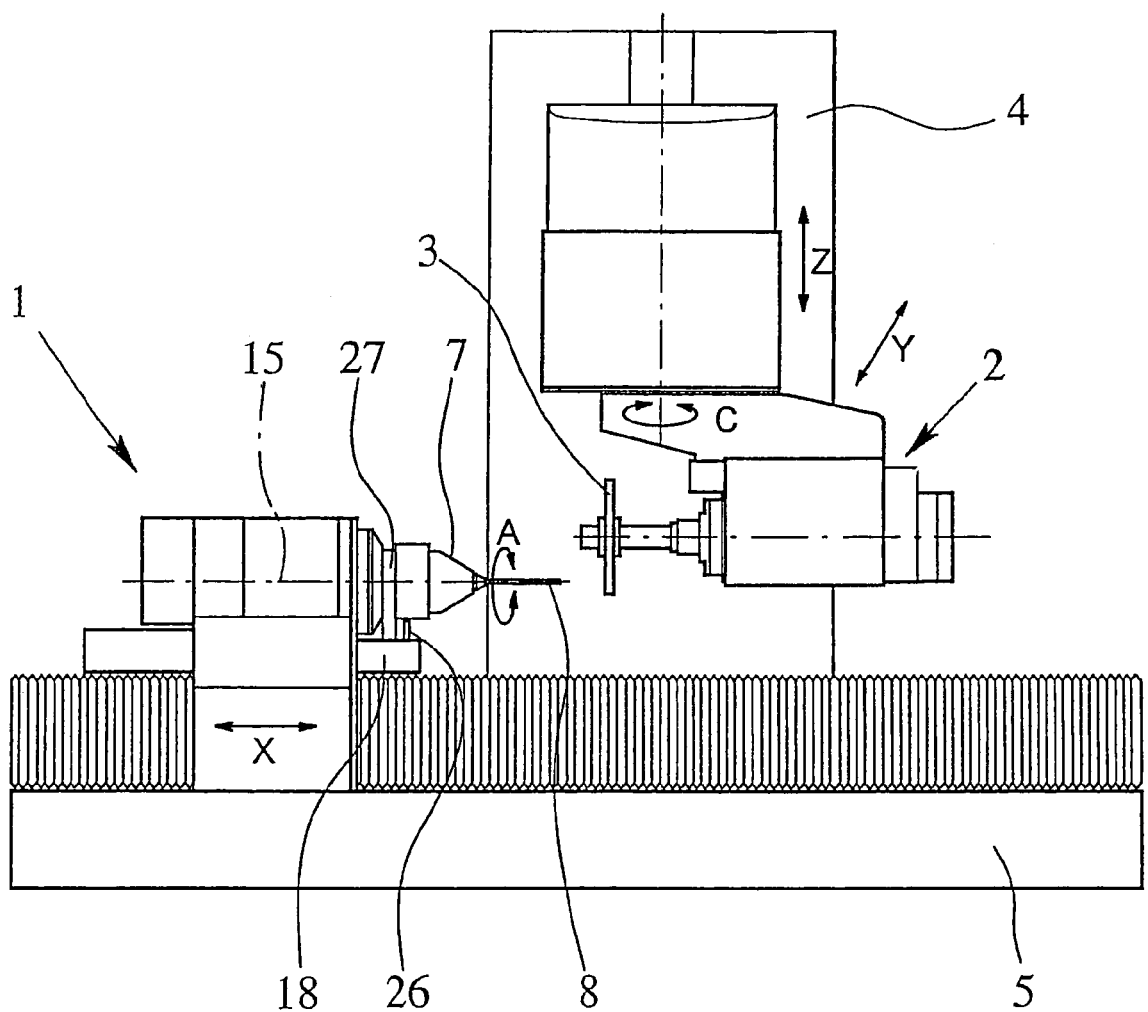
FIG. 1 is a plan view of a grinding machine with a workpiece headstock according to the present invention.

Referring now in greater detail to the drawing wherein the showings are for the purpose of illustrating preferred embodiments of the invention only, and not for the purpose of limiting the invention, the machine tool shown in the Figures is a five-axis grinding machine. Further, the figures show a workpiece headstock 1, a grinder headstock 2 with a grinding tool 3, a stand 4, and a machine bed 5. The five axes of the grinding machine are indicated in FIG. 1 by arrows.

The workpiece headstock 1 is equipped with a spindle 6 and a clamping device 7 connected to the spindle 6 so that a workpiece 8 to be machined can be clamped. A spindle drive 9 is also provided. In the embodiment shown in FIG. 2, the spindle drive 9 is designed as a direct drive. Other variants are also conceivable. The spindle 6 is supported in the conventional manner in a spindle box 10 with a forward spindle bearing 11 and a rear spindle bearing 12.

Between the spindle 6 and the clamping device 7, that is, in the present case between the headstock 13 and the clamping device 7, there is a loosenable alignment interface 14, which, after it has been loosened and while the workpiece headstock 1 otherwise remains stationary, allows the clamping device 7 and thus the clamped workpiece 8 to be aligned in a plane 16 perpendicular to the spindle axis 15. The design of the alignment interface 14 is explained in greater detail below. The essential point here is that the alignment interface 14, in the loosened state, allows an additional degree of freedom for the movement of the clamping device 7 with respect to the headstock 13 in the plane 16.

In one embodiment, the alignment interface 14 serves simultaneously as the connecting element, which must be present in any case, between the clamping device 7 and the headstock 13. In principle, however, it is also possible for the alignment interface 14 to be located between two sections of the spindle 6 or between two sections of the clamping device 7, such as in the form of an intermediate flange.

For the alignment of the clamping device 7, an adjusting device 18 separate from both the clamping device 7 and the spindle 6 is provided. This adjusting device has an actuating drive 19. The clamping device 7 can be aligned by the motor of the actuating drive 19. It can be seen in FIG. 2 that the above-mentioned separate design of the adjusting device 18, i.e., in the present case the actuating drive 19, offers very special advantages with respect to the engineering design of the device. Namely, there is no need for it to be especially compact, nor do any imbalances have to be taken into account, because the actuating drive 19 is stationary. The design of the actuating drive 19 will be explained in greater detail below. The essential point here is that the actuating drive 19 makes it possible for a motor to be used to align the clamping device 7.

A sensor arrangement 20 is also provided. The measurements obtained by these sensors make it possible to determine the eccentricity of the clamped workpiece 8. Possible embodiments of the sensor arrangement 20 will be described later in detail.

Figure 2:
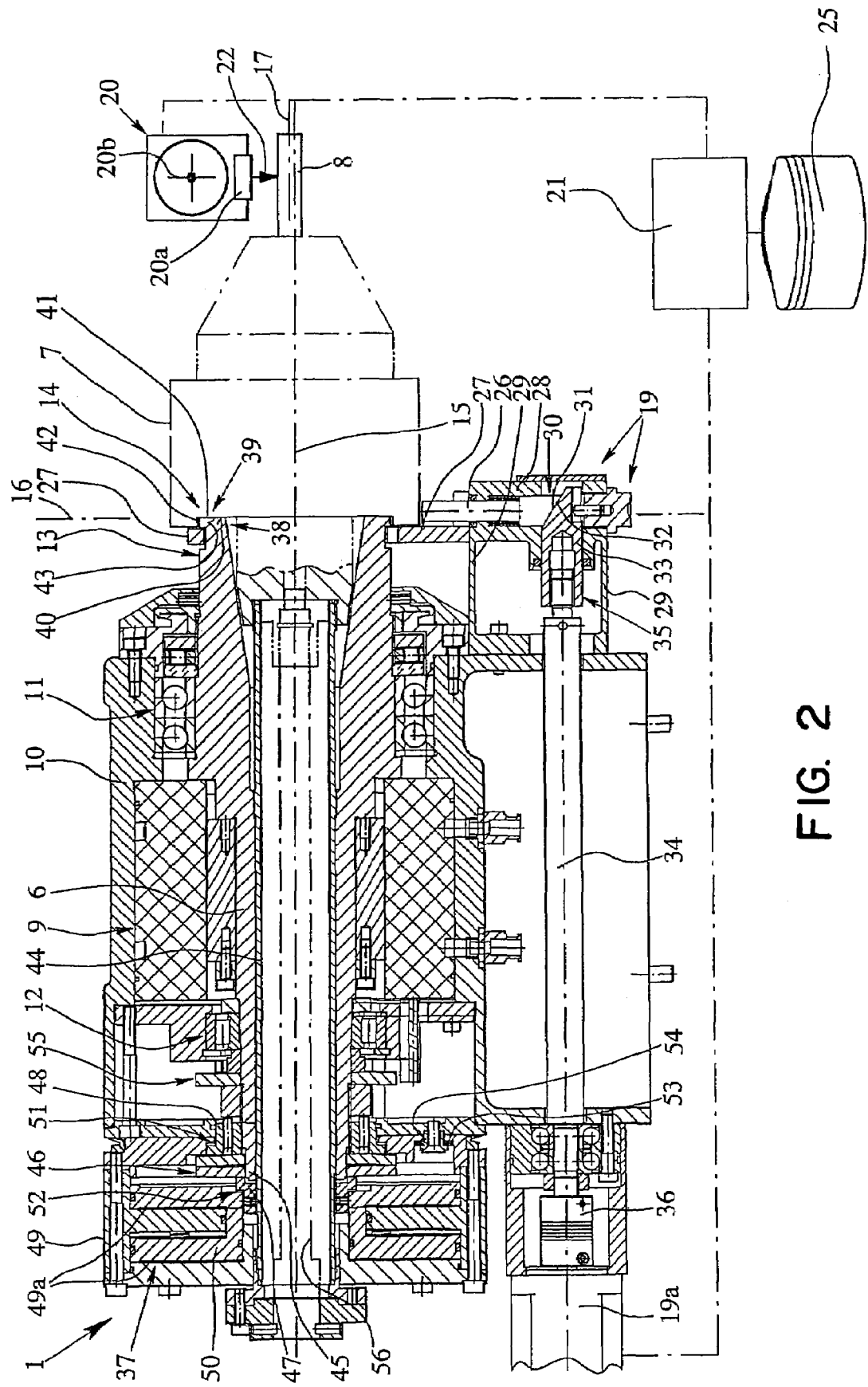
FIG. 2 is a cross-sectional view of the workpiece headstock shown in FIG. 1.
Figure 3:
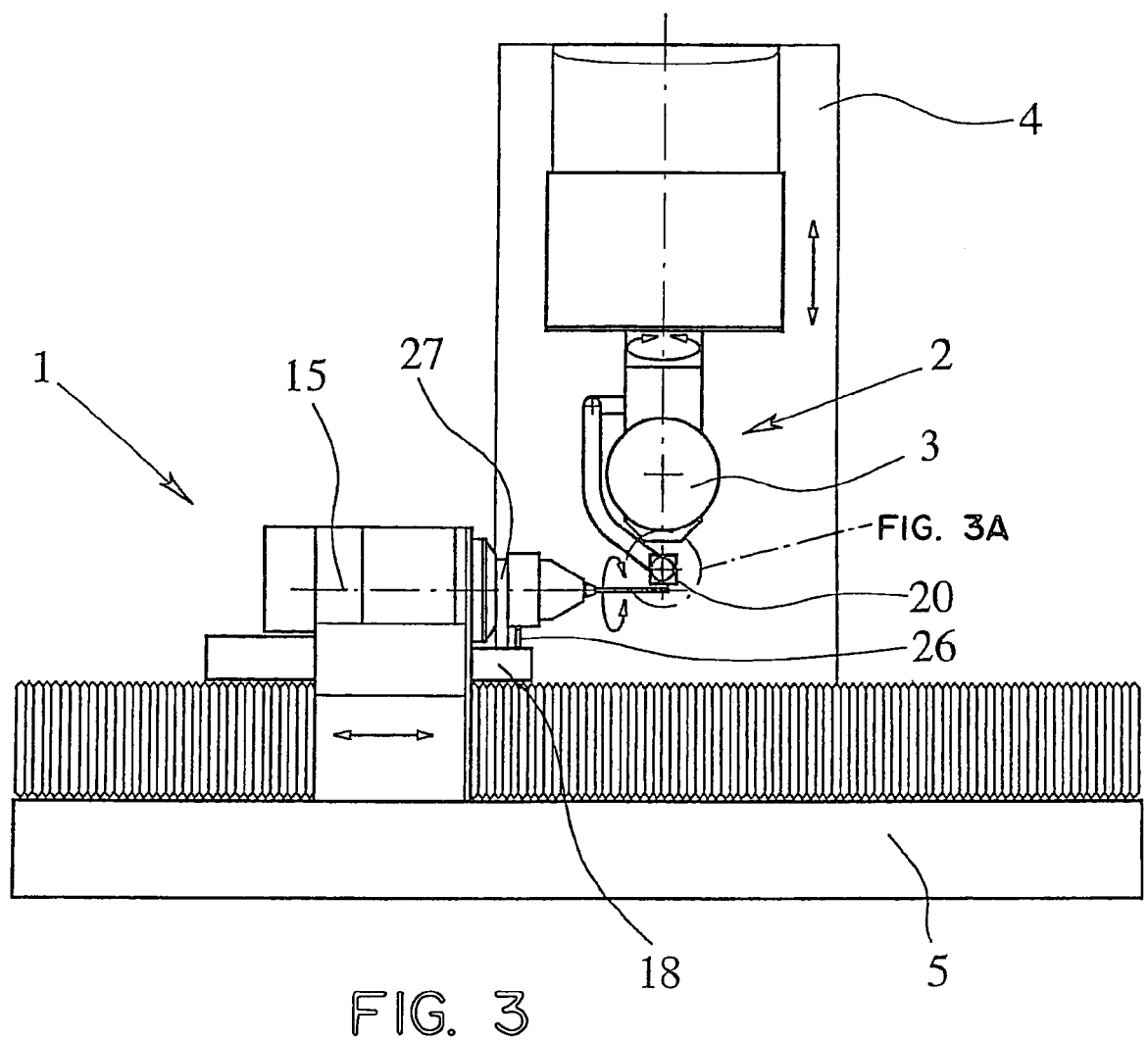
FIG. 3 is a plan view of the grinding machine shown FIG. 1 after it has been rotated 90° around the C-axis.
Figure 3A:
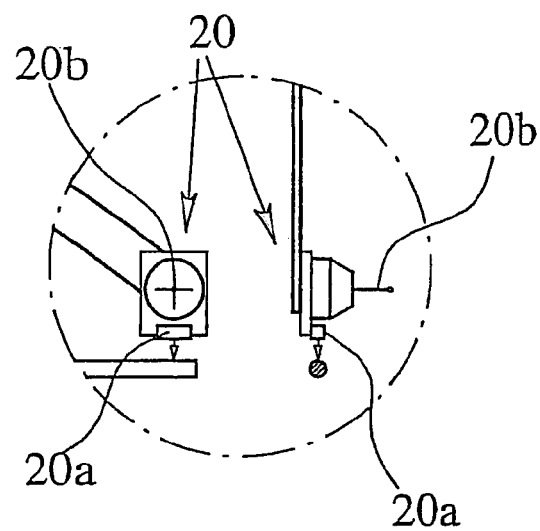
FIG. 3a is an enlarged view taken from FIG. 3.

Finally, an alignment control unit 21 is provided, which is connected to the actuating drive 19 and to the sensor arrangement 20 by means suitable for the purposes of control technology. The alignment control unit 21 is illustrated in FIG. 2 in merely schematic fashion.

The essential point now is that the alignment control unit 21 for aligning the clamping device 7 operates the actuating drive 19 as a function of the sensor measurement values of the sensor arrangement 20 and thus, together with the actuating drive 19 and the sensor arrangement 20, forms a closed-loop control circuit. The actuator of this closed-loop control circuit is the actuating drive 19. Feedback is obtained from the sensor arrangement 20. The controller required for the closed-loop control circuit is provided by the alignment control unit 21. This can be a P-controller, a PI-controller, or a PID-controller, etc.

In one embodiment, the sensor arrangement 20 has a distance sensor 20a, which, when positioned appropriately, can be used to determine the extension of the clamped workpiece 8 in the radial direction with respect to the spindle axis 15. The measuring direction 22 of the distance sensor 20a is thus radial with respect to the spindle axis 15. The measuring direction 22 is shown schematically in FIG. 4a. Several advantageous variants of the distance sensor 20a are conceivable. An inductive or capacitative sensor is preferred. In principle, however, optical sensors such as a laser distance sensor could be used. Finally, the use of probe type sensors, especially contact sensors, is also possible.

Figure 4A:
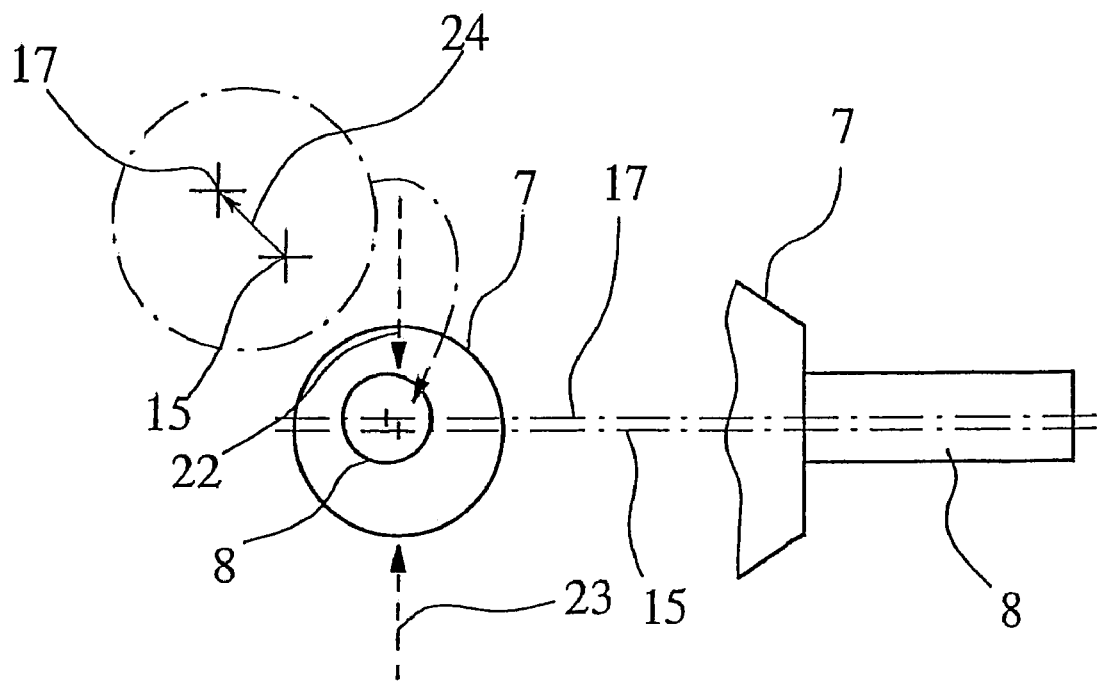
FIG. 4a is a schematic diagram of the eccentric clamping of a workpiece during the determination of the eccentricity; and, FIG. 4b is a schematic diagram of the eccentric clamping of a workpiece with the workpiece in the alignment position.
Figure 4B:
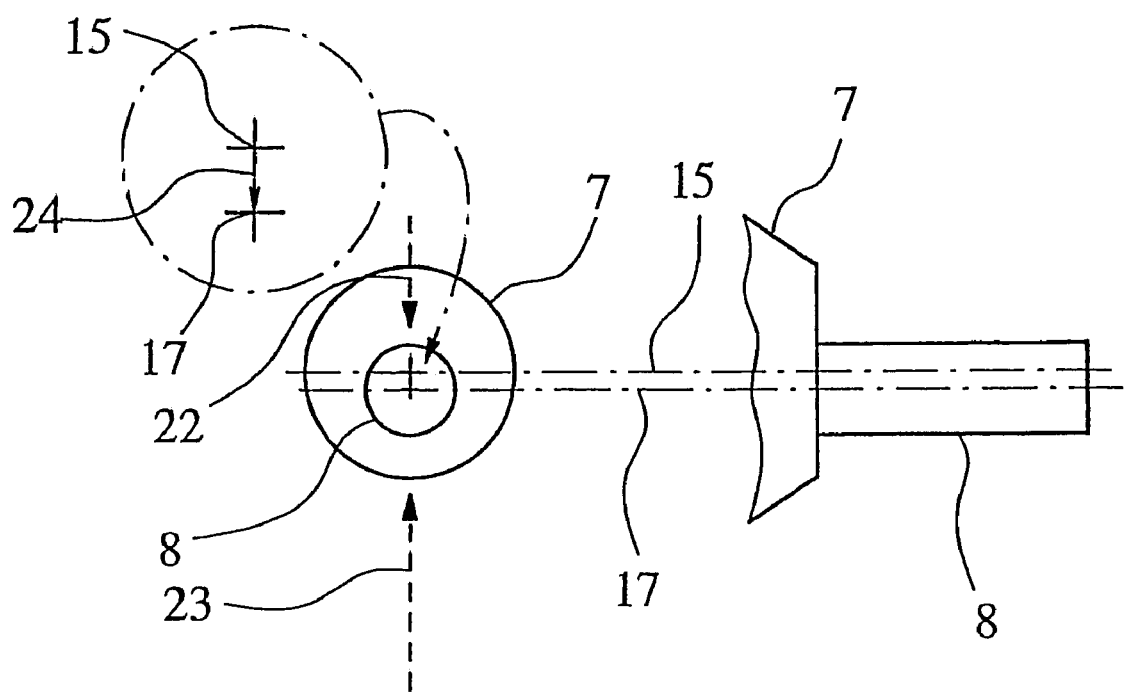

So that the clamping device 7 can be aligned, the sensor arrangement 20, especially the distance sensor 20a, is positioned in such a way that the measuring direction 22 of the distance sensor 20a is opposite the working direction 23 of the actuating drive 19 (FIG. 4b). This guarantees that an aligning movement caused by the actuating drive 19 can be measured directly by the distance sensor 20a. If the system is designed correctly, it is thus possible to dispense completely with geometric calculations to determine the completed aligning movement, which simplifies the automatic control and simultaneously accelerates it. The same advantage can also be achieved when the measuring direction 22 of the distance sensor 20a is oriented in the same direction as the working direction 23 of the actuating drive 19 during the alignment of the clamping device 7.

In another embodiment, the alignment control unit 21 uses the sensor arrangement 20 to determine the eccentricity of the clamped workpiece 8 before the clamping device 7 is aligned. The eccentricity of the clamped workpiece 8 can be described by the eccentricity vector 24, for example. The eccentricity vector 24 is the vector, perpendicular to the spindle axis 15, of the offset of the workpiece axis 17 from the spindle axis 15. It is assumed here that there is no angle between the workpiece axis 17 and the spindle axis 15. FIG. 4a shows an enlarged view of the eccentricity vector 24 by way of example.

After the eccentricity has been determined, the alignment control unit 21 positions the clamped workpiece 8 by means of the spindle drive 9 preferably in such a way that the eccentricity vector 24 is oriented in the direction opposite the working direction 23 of the actuating drive 19. This state is illustrated in FIG. 4b.

The alignment control unit 21 now drives the actuating drive 19 until the sensor arrangement 20 has confirmed that the clamped workpiece 8 has been moved radially by an amount equal to the previously determined eccentricity. One or another of the closed-loop controller designs described above will be selected as a function of the concrete circumstances.

The eccentricity of the workpiece 8 can be determined by means of the previously described sensor arrangement 20 with a distance sensor 20a in an essentially simple and error-proof manner. In yet another embodiment, the alignment control unit 21 for determining the eccentricity of the workpiece 8 by means of the sensor arrangement 20 keeps the sensor in a fixed position and measures in a fixed direction. The radial extension of the clamped workpiece 8 with respect to the spindle axis 15 is then determined at different spindle measuring positions and thus at different workpiece positions. In the case of an ideal cylindrical workpiece with an otherwise unknown workpiece geometry, exactly three measurements, each at a different spindle measuring position, are required for this method. From these three measurements, a surrounding circle can be determined, the center of which is on the workpiece axis 17. The spindle measuring positions are preferably located 120° apart. It is also possible, however, to conduct additional measurements for the purpose of compensating for any measurement errors which may have occurred.

It is more difficult to determine the eccentricity of the clamped workpiece 8 when the workpiece 8 is not an ideal cylinder and is, for example, a drill bit or milling cutter which must be reground. This has been explained above. So that the appropriate measuring positions on the workpiece 8 and the corresponding spindle measuring positions can be determined, it is preferable for the sensor arrangement 20 to determine the position of predetermined features of the clamped workpiece 8. Such features are, for example, the spiral flute of a drill bit or the cutting edge of a milling cutter. The alignment control unit 21 then determines the spindle measuring positions so that the measurements for determining the eccentricity of the clamped workpiece 8 can be performed as described above.

The sensor arrangement 20 for determining the features of the clamped workpiece 8 preferably includes a measuring probe 20b, which can serve additionally to determine the radial extension of the workpiece 8. In principle, however, it is also possible to use the distance sensor 20a for this purpose.

The relative movement between the measuring probe 20b and the workpiece 8 required for the operation of the measuring probe 20b can be realized by shifting the position of the sensor arrangement 20, i.e., the position of the sensors. In one embodiment, the sensor arrangement 20 is mounted on the grinder headstock 2. As a result, the position of the sensor arrangement 20 can be shifted along the axes C, Z, and Y shown in FIG. 1. In addition, displacement along the X-axis of the grinding machine can also be used for the measurements. The position of the sensor arrangement 20 can therefore be shifted along at least one forward-feed axis of the machine tool.

There are various methods which can be used to find the position of the predetermined features of the workpiece 8. For example, the operator can enter data such as the number of teeth and the dimensions of a milling cutter into the alignment control unit 21, whereupon the alignment control unit 21, on the basis of these data, determines the position of the corresponding teeth, etc., and measures the eccentricity.

In one embodiment, however, the alignment control unit 21 is supported by a database 25, which contains the essential geometric data of the clamped workpiece 8. Before the eccentricity of the clamped workpiece 8 is determined, the alignment control unit 21 calls up the corresponding geometric data of the clamped workpiece 8, based again, for example, on the operator's inputs or on the basis of order information from a control station, etc. Then the alignment control unit 21 conducts the corresponding measurements as described above.

During the determination of the eccentricity of the clamped workpiece 8 described above, it must be remembered not only that the spindle 6 must be brought into each of the individual spindle measuring positions but also that the sensor arrangement 20 must be aligned appropriately with the workpiece 8 in the axial direction. In the embodiment presented here, this alignment is carried out on the basis of a determination of the axial dimension of the workpiece 8 or on the basis of a determination of the position of the specific features of the workpiece 8 on the X-axis of the grinding machine.

Because the workpiece 8 can be shifted along the X axis, i.e., along the axis 15 of the spindle, the eccentricity of the clamped workpiece 8 can be measured several times at different axial points. It is possible, for example, to measure the eccentricity in at least two axial positions to determine, for example, whether, in addition to the eccentricity, there is also an angle between the workpiece axis 17 and the spindle axis 15. If the alignment control unit 21 finds that there is an angle between the workpiece axis 17 and the spindle axis 15, the alignment control unit 21 will automatically invoke an error-handling routine.

In another embodiment, the working direction 23 of the actuating drive 19 is radial with respect to the spindle axis 15. This can be seen clearly in FIGS. 4a and 4b. This radial working direction leads to an especially simple overall procedure for the alignment of the clamping device 7, because the eccentricity, as described above, can be corrected by means of a single adjusting movement of the actuating drive 19.

Upon completion of the alignment of the clamping device 7, it is preferable for the alignment control unit 21 to check the eccentricity of the clamped workpiece 8 again for test purposes. If any remaining eccentricity exceeds a certain threshold value, the alignment process described above is repeated.

With special reference to FIG. 2, the actuating drive 19 can be equipped with an actuating element 26 and a support element 27 to allow the introduction of the drive force and the corresponding support force, which are radial to the spindle axis 15. So that the clamping device 7 can be aligned, the actuating drive 19 introduces the drive force via the actuating element 26 to the clamping device 7 on one side of the alignment interface 14. The corresponding support force is conducted by the actuating drive 19 via the support element 27 to the spindle 6 on the axially opposite side of the alignment interface 14. While not required, it is preferable for the drive force and the support force to be introduced in the immediate vicinity of the alignment interface 14. This has the effect of creating a closed circuit for the flow of forces, which proceeds exclusively via the actuating drive 19 and the area immediately adjacent to the alignment interface 14 and via the alignment interface 14 itself but not via the forward spindle bearing 11. The alignment of the clamping device 7 therefore does not impose any loads on the forward spindle bearing 11.

While the workpiece 8 is being machined, the actuating drive 19, specifically the actuating element 26 and the support element 27, are disengaged from the spindle 6 and the clamping device 7. Only when the actuating drive 19 is turned on do the actuating element 26 and the support 27 come into nonpositive engagement with their assigned components. For this purpose, the drive housing 28 of the actuating drive 19 is provided with a special design.

The drive housing 28 is connected to the support element 27 and can deflect slightly in the radial direction with respect to the spindle axis 15. The reason that the drive housing 28 can deflect in this way is that the drive housing 28 is connected by a comparatively thin-walled connecting piece 29 to the spindle box 10. The elastic deformation of the connecting piece 29 thus allows the drive housing 28 to deflect to a corresponding extent. When the actuating drive 19 is not being used, the drive housing 28 is in the rest position shown in FIG. 2, in which the support element 27 is disengaged from the spindle 6 and from the clamping device 7. When the actuating drive 19 is operating, the actuating element 26 enters into nonpositive engagement with the clamping device 7 on the one side of the alignment interface 14. As a result, the drive housing 28 is pushed in the "down" direction in FIG. 2 and thus deflected radially, so that the support element 27 enters into corresponding non-positive engagement with the spindle 6 on the axially opposite side of the alignment interface 14.

It should be pointed out that the alignment interface 14 could also, in principle, be located between two sections of the spindle 6, so that then the both the drive force and the support force would be introduced into the spindle 6, one on each side of the alignment interface 14.

The situation would be similar if the alignment interface 14 were to be located between two sections of the clamping device 7.

There are various ways in which the actuating element 26 can be shifted with respect to the drive housing 28. In the embodiment shown in FIG. 2, the actuating drive 19 has a transmission 30 of the wedge type. For this purpose, the actuating element 26 is equipped with a wedge surface 31, which corresponds to a wedge surface 32 of a drive wedge 33. A linear displacement of the drive wedge 33, coaxial to the spindle axis 15, brings about a corresponding displacement of the actuating element 26 in the drive housing 28 and thus radial to the spindle axis 15. The drive wedge 33 is guided appropriately in the drive housing 28. In one embodiment, the drive wedge 33 can be shifted axially by a drive spindle 34, acting by way of a reducing gear 35 consisting of a spindle and a spindle nut. The drive spindle 34 is connected by a bellows coupling 36 to a high-precision drive motor 19a.

An interesting aspect of the design of the actuating drive 19 described above is that the ability of the drive housing 28 to deflect does not interfere with the production of an especially precise actuating movement of the actuating element 26 for aligning the clamping device 7. The connecting piece 29 which connects the drive housing 28 to the spindle box 10 is fully capable of absorbing the drive force of the drive motor 19a transmitted via the drive spindle 34 without any significant deformation, since the drive force produces only tensile stress in the connecting piece 29.

It has already been pointed out above that the clamping device 7 can be aligned only after the alignment interface 14 has been loosened. In principle, the alignment interface 14 can be loosened manually. In yet another embodiment, which makes it possible for the clamping device 7 to be aligned in a fully automated manner, however, an interface drive 37 is provided, so that the alignment interface 14 can be loosened and tightened again by the motor of the interface drive 37. The alignment control unit 21 is preferably connected operationally to the interface drive 37 and loosens the alignment interface 14 automatically before the alignment and tightens the alignment interface 14 again automatically after the alignment.

In another embodiment, the alignment interface shown in FIG. 2 has a flange 38 on the side facing the spindle and a corresponding flange 39 on the side facing the workpiece. Each of the two flanges 38, 39 has an end surface 40, 41, which is perpendicular to the spindle axis 15. The two flanges 38, 39 are in nonpositive engagement with each other by way of these two end surfaces 40, 41. For this purpose, the end surfaces 40, 41 of the two flanges 38, 39 are pretensioned against each other with a nominal pretensioning force when the alignment interface 14 is in the tightened state. In the embodiment shown here and to that extent preferred, the flange 38 on the spindle side is on the headstock 13, whereas the flange 39 on the workpiece side is on the clamping device 7. It has already been pointed out that the alignment interface 14 could also be located elsewhere, which is therefore also true for the two flanges 38, 39.

According to one embodiment, one of the two flanges 38, 39—here the flange 39 on the workpiece side—has a center bore 42, whereas the other flange—here the flange 38 on the spindle side—has a corresponding circumferential collar 43. The collar 43 is accommodated in the center bore 42, so that the difference between the diameter of the center bore 42 and that of the collar 43 limits the range of the aligning movement perpendicular to the spindle axis 15. A preferred value for this difference is approximately 60 μm, which means that an aligning movement of ±30 μm is possible.

When the alignment interface 14 is loosened, the two end surfaces 40, 41 are pretensioned against each other with an aligning pretensioning force which is less than the nominal pretensioning force, which means that it is possible for an aligning movement to take place. The frictional force between the end surfaces 40, 41 of the two flanges 38, 39 caused by the aligning pretensioning force, however, is sufficient to prevent the two end surfaces 40, 41 from shifting position independently as a result of the force of gravity acting on the clamping device 7. The nominal pretensioning force is preferably approximately 3-to-4 times the aligning pretensioning force.

To produce the pretensioning force between the end surfaces 40, 41 of the two flanges 38, 39, the spindle 6 is designed as a hollow spindle, and a draw tube 44, which is connected to the clamping device 7, specifically to the flange 39 on the workpiece side, is guided with freedom to slide through the hollow spindle 6. At the end 45 of the spindle, a spring arrangement 46 is preferably provided, which has the effect of exerting an axial pretensioning force between the spindle 6 and the draw tube 44 and thus of creating the pretensioning force between the end surfaces 40, 41 of the two flanges 38, 39. This is the "nominal pretensioning force" described above. The spring arrangement 46, furthermore, can be a disk spring arrangement 46, mounted on the spindle 46 at the end 45 of the spindle. The disk spring arrangement 46, in the embodiment shown in FIG. 2, is held in engagement with the draw tube 44 by the thrust nut 47 and in engagement with the spindle 6 by the support nut 48.

FIG. 2 also shows the basic design of the interface drive 37. The interface drive 37 is designed here as a linear drive, which introduces an axial drive force into the spindle 6 and the corresponding support force into the draw tube 44 to loosen the alignment interface 14. The interface drive 37 is equipped with a drive housing 49 and with a drive element 50, which can be deflected with respect to the drive housing 49. The drive force and the support force are introduced via the drive element 50 and the drive housing 49.

While the workpiece 8 is being machined, that is, while the interface drive 37 is not operating, the interface drive 37, specifically the drive element 50 and the drive housing 49, are disengaged from the spindle 6, from the disk spring arrangement 46, and from the draw tube 44. Only when the interface drive 37 is activated do the drive element 50 and the drive housing 49 engage with the thrust nut 47 and the support nut 48. For this purpose, a special design of the drive housing 49 of the interface drive 37 is provided.

The drive housing 49 of the interface drive 37 can be shifted axially from a rest position, i.e. toward the left in FIG. 2, as a result of which the drive housing 49 can be brought into working connection with the support nut 48. When the drive housing 49 is in the rest position, a gap 51 is present between the drive housing 49 and the support nut 48 at the spindle 6. In a corresponding manner, when the interface drive 37 is not being actuated, a gap 52 is present between the drive element 50 and the thrust nut 47.

In even yet another embodiment, the drive housing 49 of the interface drive 37 is pretensioned into the rest position against the spindle box 10. For this purpose, a disk spring arrangement 53 is again provided. This pretension is weak and serves merely to hold the drive housing 49 against the spindle box 10. In the embodiment shown here and to that extent preferred, furthermore, the drive housing 49 is connected nonrotatably to the spindle box 10 by centering sleeves 54.

The essential features of the interface drive 37 are that, in the undeflected state, the drive element 50 of the interface drive 37 is disengaged from the spindle 6, from the disk spring arrangement 46, and from the draw tube 44 (gap 52), and that the drive element 50, upon actuation of the interface drive 37, engages nonpositively, as a result of its deflection, with the draw tube 44—i.e., with the thrust nut 47 here, and, because it is supported against the draw tube 44, is able to shift the drive housing 49 axially, i.e., toward the left in FIG. 2, and brings it into nonpositive engagement with the spindle 6—i.e., with the support nut 48 here. As a result, an essentially closed circuit of force flow is guaranteed, which proceeds via the interface drive 37, the thrust nut 47, the disk spring arrangement 46, and the support nut 48. This means that the action of the force of the interface drive 37 produces no axial load on the forward or rear spindle bearings 11, 12.

As a result of the introduction of the force of the interface drive 37 into the thrust nut 47 on one side and into the support nut 48 on the other, the pretension of the end surfaces 40, 41 of the two flanges 38, 39 against each other can be decreased to the level of the above-mentioned aligning pretensioning force, which allows the clamping device 7 to be aligned as described above. The alignment interface 14 is thus now in the loosened state.

In the case of the interface drive 37, the drive element 50 is deflected with respect to the drive housing 49 by means of a twin-chamber pneumatic drive. The drive element 50 forms the piston, and accordingly the drive housing 49 forms the cylinder with two pressure chambers 49a. In principle, however, other types of drives could also be used.

For the sake of completeness, it should also be pointed out that, in FIG. 2, the index disk 55 of an incremental rotary encoder for the drive movement of the spindle 6 is shown on the left, next to the rear spindle bearing 12. The design of the rotary encoder is only of secondary importance here.

In the case of the embodiments shown in the drawing, the clamping device 7 is aligned while the spindle 6 is being held in a fixed position. In principle, it is also possible for the spindle 6 to rotate during the alignment procedure, i.e., while the actuating drive 19 is operating. The interface drive 37 would then be designed as a concomitantly rotating component. The actuating element 26 of the actuating drive 19 could, if desired, be equipped with a roller, so that it can engage with the clamping device 7. As long as the closed-loop control circuit is designed appropriately, optimal alignment results can be obtained automatically even while the spindle 6 is rotating.

Finally, it should be pointed out that the proposed solution can be used with any conceivable type of clamping device 7. In the case of the embodiment shown in FIG. 2 and to that extent preferred, the clamping device is designed as a front-end clamping device. The feed line 56 for compressed air required for this and any possible coolant which may be required are indicated in merely schematic fashion in FIG. 2.

According to one embodiment, the clamping device 7 used in a particular case can also be replaceable. That the actuating drive 19 is designed as a component separate from the clamping device 7 makes the proposed workpiece headstock 1 especially suitable for the use of replaceable clamping devices 7, because it is not necessary to equip each individual clamping device 7 separately with its own appropriate actuating drive 19.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

The invention claimed is:

1. A workpiece headstock for a machine tool, especially for a grinding machine,
   with a spindle (6);
   with a clamping device (7), which is connected to the spindle (6) and which is used to clamp a workpiece (8) to be machined; and
   with a spindle drive (9),
   where, a loosenable alignment interface (14) is provided between two sections of the spindle (6), between the spindle (6) and the clamping device (7), or between two sections of the clamping device (7);
   where, after the alignment interface (14) has been loosened and while the workpiece headstock (1) otherwise remains stationary, the clamping device (7) and thus the workpiece (8) clamped in it can be aligned in a plane perpendicular to the spindle axis (15), as a result of which any existing offset between the workpiece axis (17) and the spindle axis (15)—i.e., the eccentricity of the clamped workpiece (8)—can be eliminated;
   where an adjusting device (18) is provided for the alignment of the clamping device (7),
   the adjusting device (18) is designed as a unit separate from the clamping device (7) and from the spindle (6) and has an actuating drive (19); in that
   the clamping device (7) can be aligned by the motor of the actuating drive (19); in that
   a sensor arrangement (20) is provided, from the measurement values of which the eccentricity of the clamped workpiece (8) can be determined; in that
   an alignment control unit (21) is provided, which is connected on one side to the actuating drive (19) and on the other side to the sensor arrangement (20) in a manner suitable for the purpose of control technology; and in that
   to align the clamping device (7), the alignment control unit (21) operates the actuating drive (19) as a function of the measurement values provided by the sensor arrangement (20) and thus cooperates with the actuating drive (19) and the sensor arrangement (20) to form a closed-loop control circuit.

2. The workpiece headstock according to claim 1, wherein the sensor arrangement (20) has a preferably contactless distance sensor (20a), and in that the sensor arrangement (20) can measure the radial extension of the clamped workpiece (8) with respect to the spindle axis (15), preferably in such a way that, during the alignment of the clamping device (7), the measuring direction of the distance sensor (20a) is either opposite the working direction of the actuating drive (19) or in the same direction as the working direction of the actuating drive (19).

3. The workpiece headstock according to claim 1, wherein the alignment control unit (21) determines the eccentricity of the clamped workpiece (8) by means of the sensor arrangement (20) before the clamping device (7) is aligned; in that the alignment control unit (21) then positions the clamped workpiece (8) by means of the spindle drive (9) in such a way that the eccentricity vector—i.e., the vector of the offset of the workpiece axis (17) from the spindle axis (15), this vector being perpendicular to the spindle axis (15)—is opposite the working direction of the actuating drive (19); and in that, finally, the alignment control unit (21) continues to operate the actuating drive (19) until the sensor arrangement (20) has determined that the clamped workpiece (8) has been moved in the radial aligning direction by a distance equal to the previously determined eccentricity.

4. The workpiece headstock according to claim 1, wherein, to determine the eccentricity of the workpiece (8) by means of the sensor arrangement (20), the alignment control unit (21) measures the radial extension of the clamped workpiece (8) with respect to the spindle axis (15) at different spindle measuring positions and thus at different workpiece positions while the sensors and the measuring device are held in fixed positions.

5. The workpiece headstock according to claim 4, wherein the sensor arrangement (20) can be used to determine the position of predetermined features of the clamped workpiece (8), and in that the alignment control unit (21) determines the spindle measuring positions as a function of the position of these features.

6. The workpiece headstock according to claim 1, wherein the position of the sensor arrangement (20), i.e., the position of the sensors, can be adjusted.

7. The workpiece headstock according to claim 1, wherein a database (25) is assigned to the alignment control unit (21); in that the database (25) contains geometric data on the clamped workpiece (8); and in that the alignment control unit (21) conducts the measurements for determining the eccentricity of the clamped workpiece (8) as a function of the geometric data of the clamped workpiece (8).

8. The workpiece headstock according to claim 1, wherein the alignment control unit (21) uses the sensor arrangement (20) to measure the eccentricity at a minimum of two different axial positions.

9. The workpiece headstock according to claim 1, wherein the working direction (23) of the actuating drive (19) is radial with respect to the spindle axis (15); in that the actuating drive (19) for aligning the clamping device (7) uses an actuating element (26) to introduce a drive force, which is radial with respect to the spindle axis (15), into the clamping device (7) or into the spindle (6) on the one side of the alignment interface (14) and uses a support element (27) to introduce the corresponding support force into the clamping device (7) or into the spindle (6) on the axially opposite side of the alignment interface (14); and in that the drive force and the support force are introduced in the immediate vicinity of the alignment interface (14).

10. The workpiece headstock according to claim 1, wherein the actuating drive (19) has a drive housing (28); in that the drive housing (28) is connected to the support element (27); in that the drive housing (28) can shift position radially with respect to the spindle axis (15) and is in a rest position when the actuating drive (19) is not operating, in which position the support element (27) is disengaged from the spindle (6) and from the clamping device (7); in that, when the actuating drive (19) is operating, the actuating element (26) enters into nonpositive engagement with the clamping device (7) or the spindle (6) on one side of the alignment interface (14) and thus shifts the drive housing (28) radially in such a way that the support element (27) enters into corresponding nonpositive engagement with the clamping device (7) or the spindle (6) on the axially opposite side of the alignment interface (14).

11. The workpiece headstock according to claim 9, wherein the actuating drive (19) has a wedge type transmission (30); in that, for this purpose, the actuating element (26) has a wedge surface (31), which corresponds to a wedge surface (32) of a drive wedge (33); and in that a linear displacement of the drive wedge (33), preferably coaxial with respect to the spindle axis (15), brings about a corresponding radial shift of the actuating element (26) with respect to the spindle axis (15).

12. The workpiece headstock according to claim 1, wherein an interface drive (37) is provided, and in that the alignment interface (14) can be loosened and tightened again by the motor of the interface drive (37).

13. The workpiece headstock according to claim 1, wherein the alignment interface (14) comprises a flange (38) on the spindle side and a corresponding flange (39) on the workpiece side; in that each of the two flanges (38, 39) has an end surface (40, 41) perpendicular to the spindle axis (15), the flanges being in nonpositive engagement with each other by way of these end surfaces (40, 41); and in that the end surfaces (40, 41) of the two flanges (38, 39) are pretensioned against each other with a nominal pretensioning force when the alignment interface (14) is being held in the tightened state.

14. The workpiece headstock according to claim 13, wherein, when the alignment interface (14) is in the loosened state, the end surfaces (40, 41) of the two flanges (38, 39) are pretensioned against each other with an aligning pretensioning force which is less than the nominal pretensioning force; and in that the frictional force between the end surfaces (40, 41) of the two flanges (38, 39) caused by the aligning pretensioning force is sufficient to prevent any displacement between the two end surfaces (40, 41) which might be caused independently by the force of gravity acting on the clamping device (7).

15. The workpiece headstock according to claim 13, wherein the spindle (6) is designed as a hollow spindle; in that a draw bar (44), which is connected to the clamping device (7), especially to the flange (38) on the workpiece side, is guided in the hollow spindle with freedom to slide back and forth in it; and in that a spring arrangement (46) is provided, preferably at tend (45) of spindle, which spring arrangement exerts an axial pretensioning force between the spindle (6) and the draw bar (44) and thus creates the pretensioning force between the end surfaces (40, 41) of the spindle-side and workpiece-side flanges (38, 39).

16. The workpiece headstock according to claim 12, wherein the interface drive (37) introduces an axial drive force into the spindle (6) and the corresponding support force into the draw bar (44) to loosen the alignment interface (14); in that the interface drive (37) has a drive housing (49) and a drive element (50), which can be deflected relative to the drive housing (49); and in that the drive force and the support force are introduced via the drive element (50) and the drive housing (49).

17. The workpiece headstock according to claim 16, wherein the drive housing (49) can be shifted axially out of a rest position, and in that, as a result, the drive housing (49) can be brought into nonpositive engagement with the spindle (6).

18. The workpiece headstock according to claim 17, wherein the drive element (50) of the interface drive (37), when in the undeflected state, is disengaged from the spindle (6), from the spring arrangement (46), and from the draw bar (44); in that the drive element (50), as a result of its deflection, enters into nonpositive engagement with the draw bar (44) and, supported against the draw bar (44), shifts the drive housing (49) in the axial direction and brings it into working engagement with the spindle (6).

19. A workpiece headstock for a machine tool, the headstock comprising a spindle and a clamping device connected to the spindle, the clamping device used to clamp a workpiece to be machined about a workpiece axis; the headstock further including a spindle drive for driving the spindle about a spindle axis and a alignment interface having a loosened condition and a locked condition such that the workpiece and at least a portion of the clamping device can be aligned in a plane perpendicular to the spindle axis when in the loosened condition to allow adjustment of the workpiece relative to the spindle such that any existing offset between the workpiece axis and the spindle axis can be eliminated; the headstock further including an adjusting device separate from both the clamping device and the spindle having a powered actuating drive that is selectively engagable with at least one of the spindle and the clamping device for the adjustment; the headstock further including a sensor for measuring the offset and an alignment control unit in communication with the actuating drive and the sensor such that the control unit operates the actuating drive as a function of the measurement values provided by the sensor and thus cooperates with the actuating drive and the sensor to form a closed-loop control circuit.

* * * * *